United States Patent
Murata

(10) Patent No.: US 10,569,418 B2
(45) Date of Patent: Feb. 25, 2020

(54) ROBOT CONTROLLER FOR EXECUTING CALIBRATION, MEASUREMENT SYSTEM AND CALIBRATION METHOD

(71) Applicant: FANUC CORPORATION, Yamanashi (JP)

(72) Inventor: Yuusuke Murata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/115,562

(22) Filed: Aug. 29, 2018

(65) Prior Publication Data
US 2019/0091866 A1 Mar. 28, 2019

(30) Foreign Application Priority Data
Sep. 22, 2017 (JP) .................................. 2017-182679

(51) Int. Cl.
*B25J 9/16* (2006.01)

(52) U.S. Cl.
CPC ........... *B25J 9/1692* (2013.01); *B25J 9/1697* (2013.01); *G05B 2219/39024* (2013.01); *G05B 2219/39045* (2013.01)

(58) Field of Classification Search
CPC .................. B25J 9/1692; B25J 9/1697; G05B 2219/39024; G05B 2219/39045
See application file for complete search history.

(56) References Cited

U.S. PATENT DOCUMENTS

| | | | |
|---|---|---|---|
| 8,369,993 B2 * | 2/2013 | Kagawa ................. | B25J 9/1692 700/263 |
| 8,918,210 B2 * | 12/2014 | Kagawa ................. | B25J 9/1692 318/568.11 |
| 9,193,073 B1 * | 11/2015 | Huang ................... | B25J 9/1692 |
| 9,221,176 B2 * | 12/2015 | Suzuki .................. | B25J 9/1692 |
| 9,782,899 B2 * | 10/2017 | Chiu ..................... | B25J 9/1692 |
| 10,112,301 B2 * | 10/2018 | Deng ..................... | B25J 9/1692 |
| 10,335,964 B2 * | 7/2019 | Ogawa ..................... | F16P 3/14 |
| 2005/0107920 A1 * | 5/2005 | Ban ........................ | B25J 9/1692 700/245 |
| 2008/0004750 A1 * | 1/2008 | Ban ........................ | B25J 9/1692 700/245 |

(Continued)

FOREIGN PATENT DOCUMENTS

JP 2002-273676 A 9/2002
JP 2005-149299 A 6/2005
(Continued)

*Primary Examiner* — Ryan Rink
(74) *Attorney, Agent, or Firm* — Hauptman Ham, LLP

(57) ABSTRACT

A robot controller, a measurement system and a calibration method, by which measurement regions for improving positioning accuracy of a robot can be appropriately generated. First and second measurement regions are specified in a movable range of the robot, the calibration of a mechanical parameter of the robot is executed in each measurement region, and calibration results are stored as first and second calibration results. When the difference between the calibration results exceeds a predetermined threshold, a third measurement region is specified between the first and second measurement regions, and the calibration is further executed in the third measurement region. The result of the further calibration is stored as a third calibration result.

12 Claims, 5 Drawing Sheets

(56) References Cited

U.S. PATENT DOCUMENTS

| | | | |
|---|---|---|---|
| 2008/0188986 A1* | 8/2008 | Hoppe | B25J 9/1692 700/263 |
| 2009/0118864 A1 | 5/2009 | Eldridge et al. | |
| 2011/0046782 A1* | 2/2011 | Fixell | B25J 9/1692 700/251 |
| 2013/0211782 A1* | 8/2013 | Rosenberg | B25J 9/16 702/182 |
| 2015/0241203 A1 | 8/2015 | Jordil et al. | |
| 2016/0184996 A1* | 6/2016 | Ishige | B25J 9/1692 700/254 |
| 2017/0151671 A1* | 6/2017 | Ishige | B25J 9/1692 |
| 2018/0178378 A1* | 6/2018 | Hagino | B25J 9/1692 |
| 2018/0243911 A1* | 8/2018 | Harada | B25J 9/1692 |

FOREIGN PATENT DOCUMENTS

| | | |
|---|---|---|
| JP | 2006-82170 A | 3/2006 |
| JP | 2008-12604 A | 1/2008 |
| JP | 2009-125857 A | 6/2009 |
| JP | 2010-142901 A | 7/2010 |
| JP | 2014-151427 A | 8/2014 |
| JP | 2017-505240 A | 2/2017 |

\* cited by examiner

ROBOT CONTROLLER FOR EXECUTING CALIBRATION, MEASUREMENT SYSTEM AND CALIBRATION METHOD

RELATED APPLICATIONS

The present application claims priority to Japanese Application Number 2017-182679, filed Sep. 22, 2017, the disclosure of which is hereby incorporated by reference herein in its entirety.

BACKGROUND OF THE INVENTION

1. Field of the Invention

The present invention relates to a robot controller for executing calibration of a robot, a measurement system and a calibration method.

2. Description of the Related Art

As a means or method for improving a positioning accuracy of a robot, a calibration of a mechanical parameter is well known. The mechanical parameter is used in a relational expression determining a relationship between a displacement of each drive axis of the robot and a position/orientation of a front end of the robot.

On the other hand, some techniques for executing the calibration are well known (e.g., a technique to use a camera attached to a robot (see JP 2008-012604 A and JP 2014-151427 A), a technique for using a measuring instrument including a dial gauge, a mirror and an angle meter (see JP 2002-273676 A), or a technique for using a probe having a spherical front end (see JP 2009-125857 A).

In the prior art, the calibration is executed with respect to a specified or limited measurement region, not the whole of a movable range of the robot, in terms of cost and labor. Therefore, the positioning accuracy can be improved in the measurement region where the calibration is executed. However, in another region relatively away from the measurement region, the positioning accuracy may be decreased due to elastic deformation of a robot arm and/or a backlash of a gear in each axis of the robot.

SUMMARY OF THE INVENTION

One aspect of the present disclosure is a robot controller configured to control a robot, comprising: a specifying section configured to specify at least two measurement regions within a movable range of a movable part of the robot, the at least two measurement regions including a first measurement region and a second measurement region different from the first measurement region; a calibration executing section configured to execute a calibration of a mechanical parameter of the robot by moving the movable part of the robot into the first measurement region, and execute a calibration of the mechanical parameter of the robot by moving the movable part of the robot into the second measurement region; and a storing section configured to store the mechanical parameter obtained by the calibration in the first measurement region as a first calibration result, and store the mechanical parameter obtained by the calibration in the second measurement region as a second calibration result, wherein the specifying section specifies a third measurement region between the first and second measurement regions, based on the first and second calibration results stored in the storing section; the calibration executing section executes a calibration of the mechanical parameter of the robot by moving the movable part of the robot into the third measurement region; and the storing section stores the mechanical parameter obtained by the calibration in the third measurement region as a third calibration result.

Another aspect of the present disclosure is a measurement system comprising: a target; a light-receiving device configured to capture an image of the target; a robot having a movable part to which the target or the light-receiving device is attached; a robot controller configured to control the robot; a specifying section configured to specify at least two measurement regions within a movable range of the movable part of the robot, the at least two measurement regions including a first measurement region and a second measurement region different from the first measurement region; a calibration executing section configured to execute a calibration of a mechanical parameter of the robot by moving the movable part of the robot into the first measurement region, and execute a calibration of the mechanical parameter of the robot by moving the movable part of the robot into the second measurement region; and a storing section configured to store the mechanical parameter obtained by the calibration in the first measurement region as a first calibration result, and store the mechanical parameter obtained by the calibration in the second measurement region as a second calibration result, wherein the specifying section specifies a third measurement region between the first and second measurement regions, based on the first and second calibration results stored in the storing section; the calibration executing section executes a calibration of the mechanical parameter of the robot by moving the movable part of the robot into the third measurement region; and the storing section stores the mechanical parameter obtained by the calibration in the third measurement region as a third calibration result.

Still another aspect of the present disclosure is a calibration method for a robot included in a measurement system, the measurement system including: a target; a light-receiving device configured to capture an image of the target; the robot having a movable part to which the target or the light-receiving device is attached; and a robot controller configured to control the robot, the calibration method comprising the steps of: specifying at least two measurement regions within a movable range of the movable part of the robot, the at least two measurement regions including a first measurement region and a second measurement region different from the first measurement region; executing a calibration of a mechanical parameter of the robot by moving the movable part of the robot into the first measurement region, and executing a calibration of the mechanical parameter of the robot by moving the movable part of the robot into the second measurement region; storing the mechanical parameter obtained by the calibration in the first measurement region as a first calibration result, and storing the mechanical parameter obtained by the calibration in the second measurement region as a second calibration result; specifying a third measurement region between the first and second measurement regions based on the first and second calibration results; executing a calibration of the mechanical parameter of the robot by moving the movable part of the robot into the third measurement region; and storing the mechanical parameter obtained by the calibration in the third measurement region as a third calibration result.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTION

Figure 1:
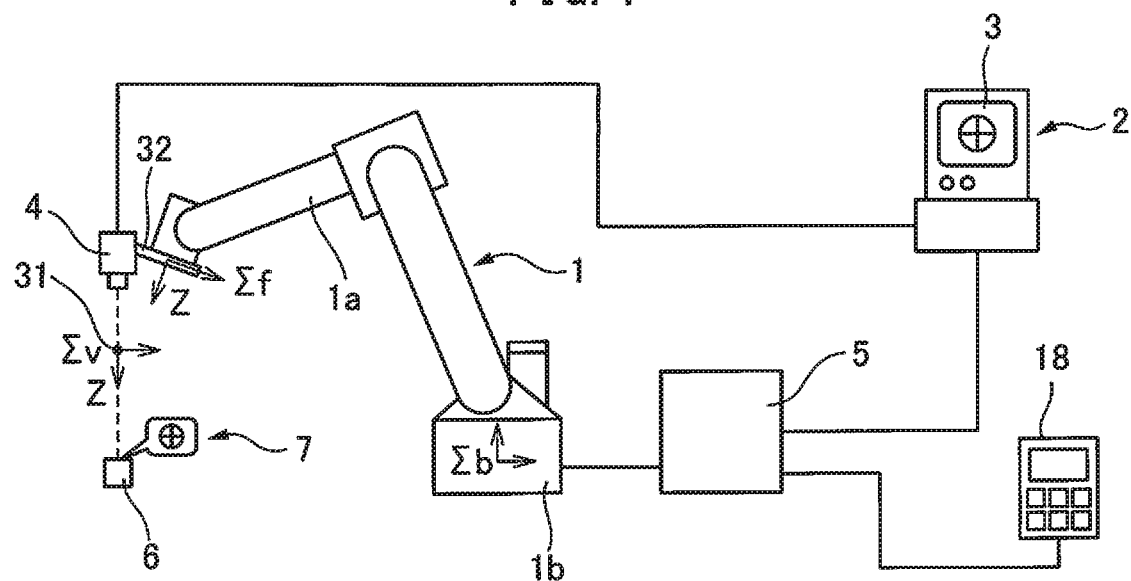
FIG. 1 is a diagram showing a schematic configuration of a measurement system according to a first embodiment of the present disclosure.

FIG. 1 shows a schematic configuration of a measuring system according to a first embodiment. Robot 1 may be a typical multi-jointed robot connected to a robot controller 5 for controlling robot 1, and has an arm (or a movable part) 1a and a base 1b. A camera 4 is attached to a tool attachment surface 32 or a front end of arm 1a. In robot 1, a robot coordinate system Σb is set and fixed to base 1b of the robot, and a mechanical interface coordinate system Σf is set and fixed to tool attachment surface 32. Robot controller 5 may be informed of the (current) position of the origin and the orientation of mechanical interface coordinate system Σf, as needed. A teach pendant 18 having a conventional manual key is connected to robot controller 5, whereby an operator may operate robot 1 by operating the manual key.

For example, camera 4 is a CCD camera, which is a conventional light receiving device capable of capturing and detecting a two-dimensional image on a light receiving surface (or a CCD array) thereof. Camera 4 is connected to an image processing unit 2 having a monitor 3 such as a LCD or a CRT, etc. In the embodiment, camera 4 may image a mark 7 on a target 6 positioned at a fixed place in a space represented by robot coordinate system Σb.

Figure 2:
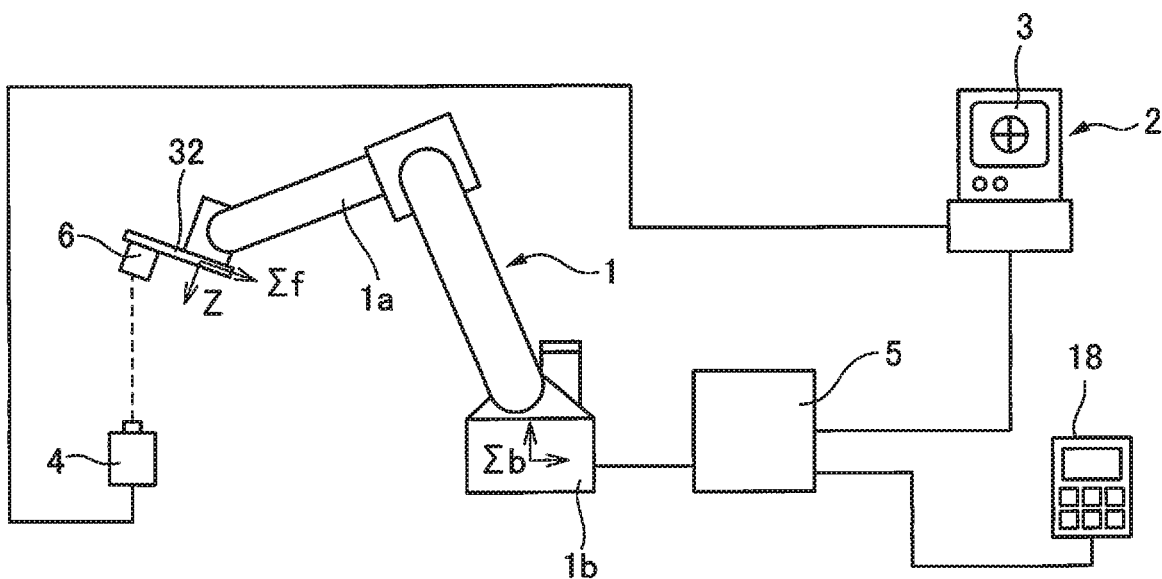
FIG. 2 is a diagram showing a schematic configuration of a measurement system according to a second embodiment of the present disclosure.

On the other hand, as a second embodiment as shown in FIG. 2, target 6 may be fixed to tool attachment surface 32 (i.e., mechanical interface coordinate system Σf), and camera 4 may be positioned at a fixed place in the space represented by robot coordinate system Σb. In this way, the light receiving device and the target may be relatively freely arranged. Further, since the positional relationship between the light receiving device and the target may be automatically and precisely adjusted, it is not necessary to control the accuracy of the arrangement of the light receiving device and the target. Since the procedure of measurement in the configuration of FIG. 2 may be the same of that of FIG. 1, the explanation below is related to the first embodiment.

Figure 3:
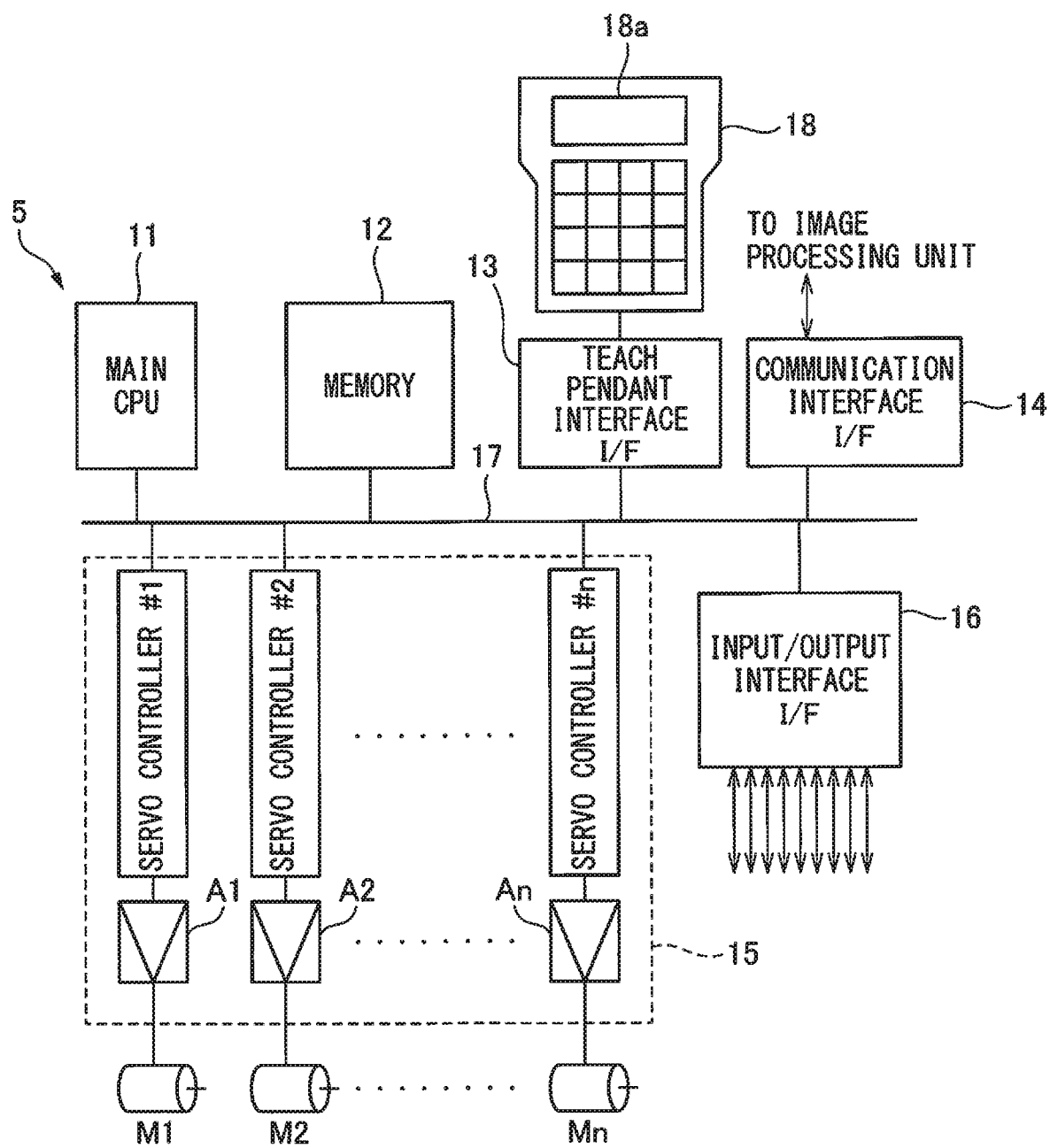
FIG. 3 is a diagram showing a block configuration of a robot controller.

FIG. 3 is a block diagram showing the configuration of robot controller 5. Robot controller 5 has a main CPU (a main central processing unit) 11; a memory 12 including a RAM (random access memory), a ROM (read-only memory) and a non-volatile memory, etc.; a teach pendant interface 13; a communication interface 14; a servo control unit 15; and an input/output interface 16 for external units, which are connected each other via a bus 17. In the first embodiment, the functions of the specifying section, the calibration executing section and the parameter applying section of the present disclosure may be realized by main CPU 11, and the function of the storing section may be realized by memory 12. However, at least one of these sections may be realized by another device other than robot controller 5 (e.g., a personal computer connected to robot controller 5).

Teach pendant 18 connected to teach pendant interface 13 may be a portable operation panel having a display 18a. By manually operating teach pendant 18, the operator can prepare, correct, and register a motion program for the robot, can set various parameters, can execute (repeat) the taught motion program, and can execute jog feed, etc. A system program, for supporting the basic function of the robot and the robot controller, is stored in the ROM of memory 12. The motion program of the robot taught according to the application and relevant set data are stored in the non-volatile memory of memory 12. A program and parameters are also used to execute various processes (for movement of the robot relating to the calculation of the mechanical parameters and for communication with the image processing unit therefor) as described below are also stored in the non-volatile memory of memory 12.

The RAM of memory 12 is used as a storage area to temporarily store various data processed by main CPU 11. Servo control unit 15 has servo controllers #1 to #n, where "n" is a total number of axes of the robot, and n is assumed to be equal to 6 in this case. Servo control unit 15 receives a shift command prepared through operations (such as a path plan preparation, and interpolation and an inverse transformation based on the plan) to control the robot. Servo control unit 15 then outputs torque commands to servo amplifiers A1 to An based on the shift command and feedback signals received from pulse coders not shown belonging to the axes. Each of servo amplifiers A1 to An supplies a current to the servomotor of each axis based on each torque command, so as to drive each servomotor. Communication interface 14 is connected to image processing unit 2 (see FIG. 1). Robot controller 5 exchanges commands relevant to measurement and measured data described below with image processing unit 2 via communication interface 14.

Figure 4:
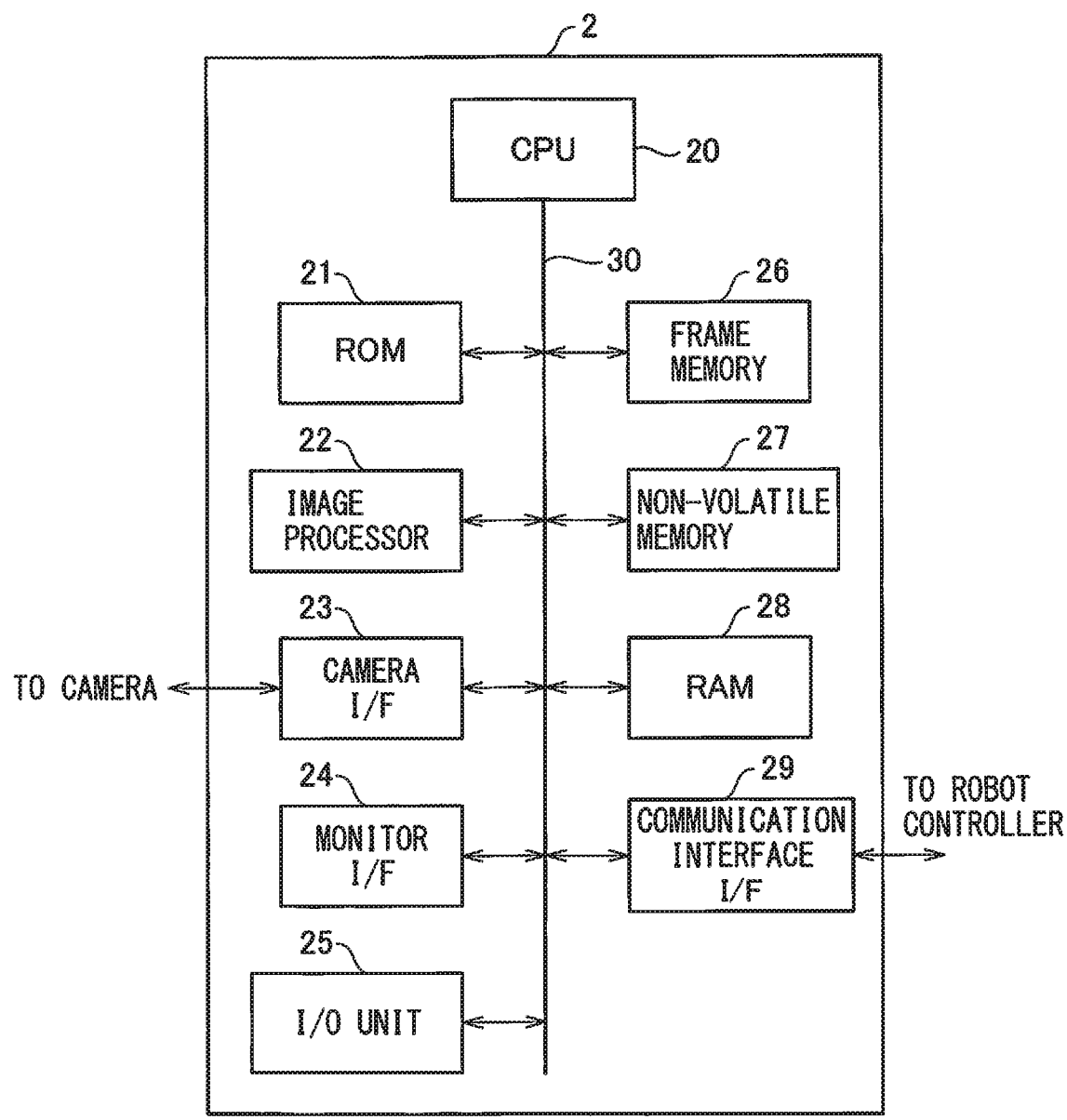
FIG. 4 is a diagram showing a block configuration of an image processing unit.

FIG. 4 is a block diagram showing the configuration of image processing unit 2. Image processing unit 2 has a CPU 20 including a microprocessor, and also has a ROM 21, an image processor 22, a camera interface 23, a monitor interface 24, an input/output (I/O) unit 25, a frame memory (i.e., an image memory) 26, a non-volatile memory 27, a RAM 28 and a communication interface 29, that are connected to CPU 20 via a bus line 30.

A camera as an imaging unit, which is a CCD camera in this case, is connected to camera interface 23. When the camera receives an imaging command via camera interface 23, the camera captures an image using an electronic shutter function incorporated in the camera. The camera sends an obtained video signal to frame memory 26 via camera interface 23, and frame memory 26 stores the video signal in the form of a grayscale signal. A monitor (see FIG. 1) such as an LCD or a CRT, etc., is connected to monitor interface 24. The monitor displays images currently obtained by the camera, past images stored in frame memory 26, or images processed by image processor 22, as required.

As shown in FIG. 1, camera 4 captures an image of mark 7 on target 6 arranged in a space represented by robot coordinate system Σb. Image processor 22 analyses the video signal of the image of mark 7 stored in frame memory 26, and the two-dimensional position and the size of the mark is calculated. A program and parameters for this calculation are stored in non-volatile memory 27. RAM 28 is used to temporarily store the data used by CPU 20 so as to execute various processing. Communication interface 29 is connected to the robot controller via communication interface 14 at the robot controller side.

Figure 5:
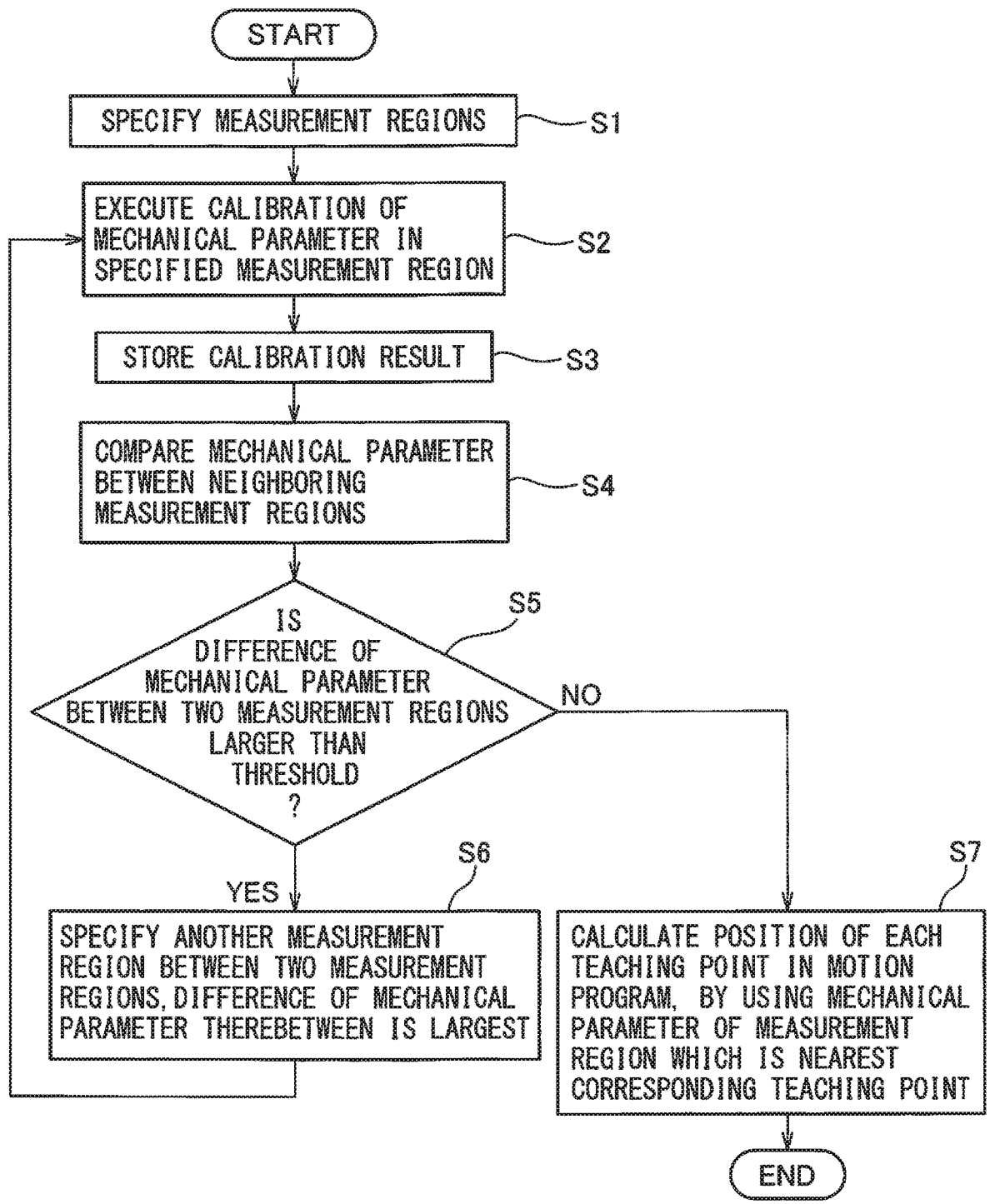
FIG. 5 is a flowchart showing an example of a calibration method in the measurement system.
Figure 6:
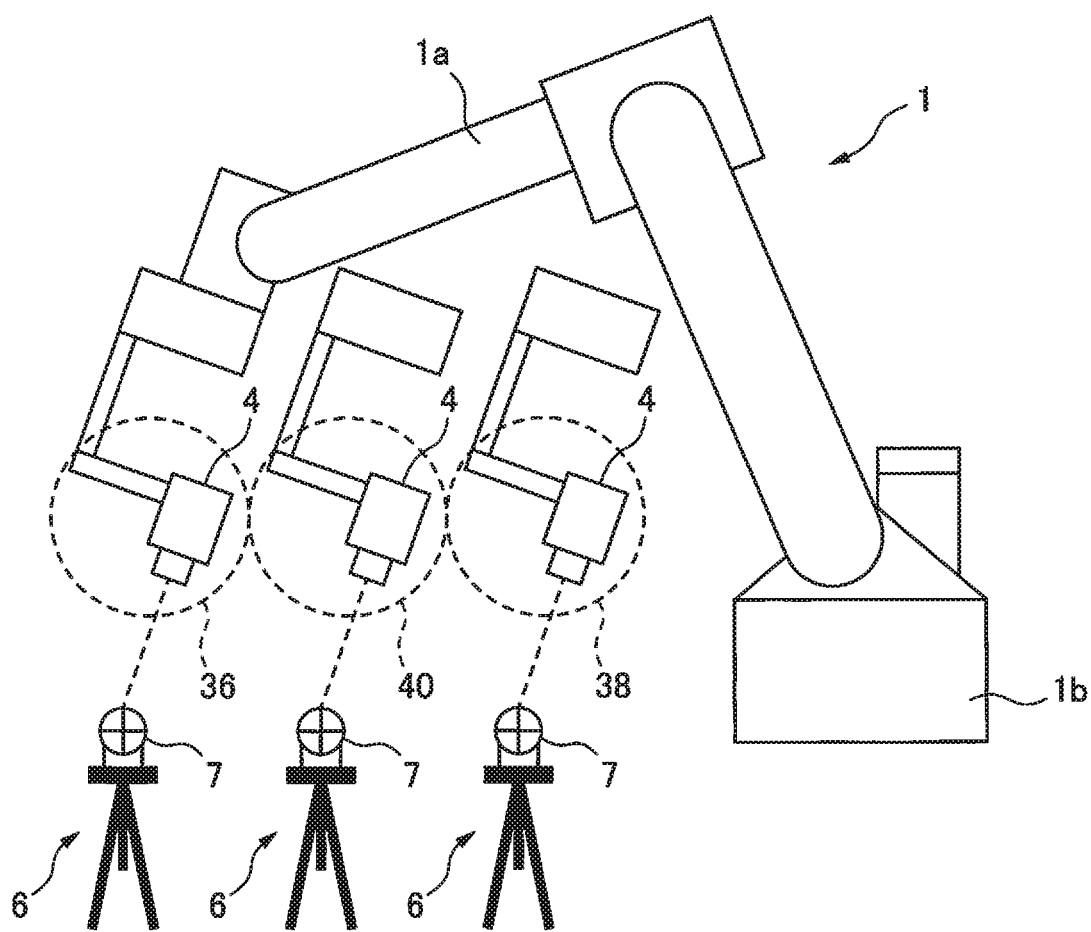
FIG. 6 is a diagram showing an example of setting of a measurement region.

Next, a procedure of a measurement process (calibration) in the first embodiment will be explained with reference to a flowchart of FIG. 5. First, as shown in FIG. 6, a plurality of measurement regions (in this example, a first measurement region 36 and a second measurement region 38) are specified in a movable range of the movable part (arm 1a) of robot 1 (step S1). Then, in each measurement region, a calibration of a mechanical parameter is executed (step S2).

In the next step S3, a result of the calibration is stored in the storing section. In this example, the mechanical parameter obtained by the calibration in first measurement region 36 is stored as a first calibration result, and the mechanical parameter obtained by the calibration in second measurement region 38 is stored as a second calibration result.

Figure 7:
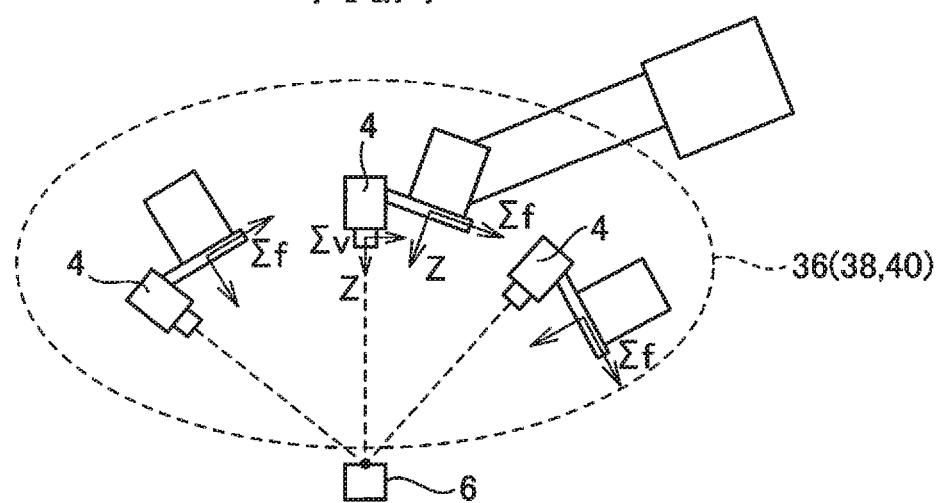
FIG. 7 is a diagram showing an example of a positional relationship between a camera and a target when the calibration is executed.

The calibration of the mechanical parameter in each measurement region may be executed by capturing (identifying) target 6 (mark 7) by using camera 4 from the different directions, as shown in FIG. 7. The detail of the calibration will be omitted, since the conventional technique as described in JP 2008-012604 A, etc., can be applied thereto. The measurement region means an area within which the movable part (arm 1a) of robot 1 can be moved (i.e., a sweep space of the robot) when the calibration is executed by using the camera 4 from the plural directions, or an approximate space of the sweep space (see FIG. 7). In addition, target 6 (mark 7) is arranged with respect to each measurement region.

Herein, the mechanical parameter means a parameter used in a relational expression for determining the correlation between the displacement (or an input) of each drive axis of the robot used for controlling the robot and the position (or an output) of the front end of the robot. The representative parameter is the length of each link of the robot, or the position of the origin of each axis of the robot. Backlash generated due to the rotation of the axis, the amount of elastic deformation of the link or a reducer may also be used as the mechanical parameter. In the present disclosure, the type of the mechanical parameter determined by identifying calculation is not limited to a specified one, as long as the mechanical parameter can be formulated and is independent from the other parameters. For example, the mechanical parameter may be a count value of an encoder corresponding to a reference (zero-degree position) of a rotation angle of each axis of the robot. Since the count value of the encoder arranged in each axis can be converted to the rotation angle of the axis, the count value of the encoder corresponding to the zero-degree position of each axis can be calculated by the above calibration.

In the next step S4, the mechanical parameters (or the calibration results) obtained by the calibration in the measurement regions and stored in the storing section are compared between the neighboring measurement regions. Herein, the neighboring measurement regions means two measurement regions, wherein there is no other measurement region which is the nearest to an intermediate position between the two measurement regions. It is assumed that the representative position of the measurement region is the position of a tool center point (TCP) of robot 1 with respect to one of a plurality of positions/orientations of camera 4 (i.e., a reference orientation) when capturing (measuring) target 6 for the calibration. In this example, the first calibration result in first measurement region 36 and the second calibration result in second measurement region 38 are compared.

In the next step S5, it is judged as to whether or not there are the neighboring measurement regions in which the difference between the compared mechanical parameters exceeds a predetermined threshold. For example, in case that the mechanical parameter is the encoder count value as described above, when the encoder count value obtained by the calibration in first measurement region 36 corresponding to the zero-degree position of one axis of the robot is ten, when the encoder count value obtained by the calibration in second measurement region 38 corresponding to the zero-degree position of the same axis of the robot is thirteen, and when the above threshold is two, it is judged that the difference between the mechanical parameters exceeds the threshold. In such a case, it can be judged that, with respect to the same axis, the difference of the angle corresponding to the zero-position exceeds a predetermined tolerance (e.g., 0.5 degrees) between the measurement regions.

In step S5, when there are the neighboring measurement regions wherein the difference of the mechanical parameters of the regions exceeds the threshold, the procedure progresses to step S6, in which a new measurement region is specified between the neighboring measurement regions, the difference of which is the largest. In this example, a new (third) measurement region 40 is specified between first measurement region 36 and second measurement region 38, and the procedure is returned to step S2. In step S2, similarly to the first and second measurement regions, the calibration of the mechanical parameter is executed in third measurement region 40. Then, in step S3, the mechanical parameter obtained by the calibration in third measurement region 40 is stored as a third calibration result in the storing section. In step S4, the mechanical parameters are compared between first measurement region 36 and third measurement region 40, and the mechanical parameters are compared between second measurement region 38 and third measurement region 40. Further, in step S5, it is judged as to whether or not the difference of the compared mechanical parameters exceeds the threshold. For example, when the difference between the first and third calibration results exceeds the threshold and is larger than the difference between the second and third calibration results, a further new (fourth) measurement region is specified between first measurement region 36 and third measurement region 40 in step S6, and the procedure is retuned to step S2.

As explained above, the new measurement region is specified between the neighboring measurement regions when the difference of the mechanical parameters of the neighboring regions exceeds the threshold, and then, the calibration is executed in the new region and the result of the calibration is stored. This procedure is repeated until any difference of the mechanical parameters of the neighboring regions does not exceed the threshold.

On the other hand, in step S5, in case that any difference of the mechanical parameters of the neighboring regions does not exceed the threshold, when a motion program, which has been separately prepared (in offline) and includes teaching points, is to be executed, the position (and the orientation) of the robot is calculated by applying the mechanical parameter obtained by the calibration in the measurement region which is the nearest to each teaching point to the corresponding teaching point in the motion program (step S7).

For example, the representative position of the measurement region "between" the plurality of (first and second)

measurement regions, such as the third measurement region, may be specified as an intermediate position between the representative positions of the plurality of measurement regions.

In the present disclosure, the calibration is executed in each of the different two measurement regions, and then, only when the difference between the mechanical parameters corresponding to the respective calibration results exceeds the predetermined threshold, the new measurement region may be set or specified between the measurement regions, and the calibration may be further executed in the new measurement region. Therefore, when executing the motion program including the teaching points for the robot, the robot can be moved with high positioning accuracy, by using the mechanical parameter corresponding to the calibration result in the measurement region which is the nearest to each teaching point. Accordingly, in the present disclosure, the positional accuracy can be improved in comparison to when only one measurement region is specified. In addition, in the present disclosure, in comparison to when three or more measurement regions are previously prepared, it can be avoided that unnecessary measurement region (making little contribution to the positioning accuracy) is specified.

According to the present disclosure, the positioning accuracy of the robot can be effectively improved, with as less measurement regions as possible.

While the invention has been described with reference to specific embodiments, it will be understood, by those skilled in the art, that various changes or modifications may be made thereto without departing from the scope of the following claims.

The invention claimed is:

1. A robot controller configured to control a robot, comprising:
   a specifying section configured to specify at least two measurement regions within a movable range of a movable part of the robot, the at least two measurement regions including a first measurement region and a second measurement region different from the first measurement region;
   a calibration executing section configured to execute a calibration of a mechanical parameter of the robot by moving the movable part of the robot into the first measurement region, and execute a calibration of the mechanical parameter of the robot by moving the movable part of the robot into the second measurement region; and
   a storing section configured to store the mechanical parameter obtained by the calibration in the first measurement region as a first calibration result, and store the mechanical parameter obtained by the calibration in the second measurement region as a second calibration result,
   wherein the specifying section specifies a third measurement region between the first and second measurement regions, based on the first and second calibration results stored in the storing section; the calibration executing section executes a calibration of the mechanical parameter of the robot by moving the movable part of the robot into the third measurement region; and the storing section stores the mechanical parameter obtained by the calibration in the third measurement region as a third calibration result.

2. The robot controller as set forth in claim 1, wherein the specifying section specifies the third measurement region when a difference between the first and second calibration results exceeds a predetermined threshold.

3. The robot controller as set forth in claim 1, wherein the specifying section specifies the third measurement region when, with respect to an intermediate position between the first and second measurement regions, a difference between a position calculated by using the first calibration result and a position calculated by using the second calibration result exceeds a predetermined threshold.

4. The robot controller as set forth in claim 1, further comprising a parameter applying section configured to, when a motion program of the robot is executed, apply the mechanical parameter to each teaching point included in the motion program, wherein the applied mechanical parameter corresponds to the calibration result in one of the measurement regions which is the nearest to the teaching point.

5. A measurement system comprising:
   a target;
   a light-receiving device configured to capture an image of the target;
   a robot having a movable part to which the target or the light-receiving device is attached;
   a robot controller configured to control the robot;
   a specifying section configured to specify at least two measurement regions within a movable range of the movable part of the robot, the at least two measurement regions including a first measurement region and a second measurement region different from the first measurement region;
   a calibration executing section configured to execute a calibration of a mechanical parameter of the robot by moving the movable part of the robot into the first measurement region, and execute a calibration of the mechanical parameter of the robot by moving the movable part of the robot into the second measurement region; and
   a storing section configured to store the mechanical parameter obtained by the calibration in the first measurement region as a first calibration result, and store the mechanical parameter obtained by the calibration in the second measurement region as a second calibration result,
   wherein the specifying section specifies a third measurement region between the first and second measurement regions, based on the first and second calibration results stored in the storing section; the calibration executing section executes a calibration of the mechanical parameter of the robot by moving the movable part of the robot into the third measurement region; and the storing section stores the mechanical parameter obtained by the calibration in the third measurement region as a third calibration result.

6. The measurement system as set forth in claim 5, wherein the specifying section specifies the third measurement region when a difference between the first and second calibration results exceeds a predetermined threshold.

7. The measurement system as set forth in claim 5, wherein the specifying section specifies the third measurement region when, with respect to an intermediate position between the first and second measurement regions, a difference between a position calculated by using the first calibration result and a position calculated by using the second calibration result exceeds a predetermined threshold.

8. The measurement system as set forth in claim 5, further comprising a parameter applying section configured to, when a motion program of the robot is executed, apply the mechanical parameter to each teaching point included in the motion program, wherein the applied mechanical parameter corresponds to the calibration result in one of the measurement regions which is the nearest to the teaching point.

9. A calibration method for a robot included in a measurement system, the measurement system including: a target; a light-receiving device configured to capture an image of the target; the robot having a movable part to which the target or the light-receiving device is attached; and a robot controller configured to control the robot, the calibration method comprising the steps of:

specifying at least two measurement regions within a movable range of the movable part of the robot, the at least two measurement regions including a first measurement region and a second measurement region different from the first measurement region;

executing a calibration of a mechanical parameter of the robot by moving the movable part of the robot into the first measurement region, and executing a calibration of the mechanical parameter of the robot by moving the movable part of the robot into the second measurement region;

storing the mechanical parameter obtained by the calibration in the first measurement region as a first calibration result, and storing the mechanical parameter obtained by the calibration in the second measurement region as a second calibration result;

specifying a third measurement region between the first and second measurement regions based on the first and second calibration results;

executing a calibration of the mechanical parameter of the robot by moving the movable part of the robot into the third measurement region; and storing the mechanical parameter obtained by the calibration in the third measurement region as a third calibration result.

10. The calibration method as set forth in claim 9, wherein the third measurement region is specified when a difference between the first and second calibration results exceeds a predetermined threshold.

11. The calibration method as set forth in claim 9, wherein the third measurement region is specified when, with respect to an intermediate position between the first and second measurement regions, a difference between a position calculated by using the first calibration result and a position calculated by using the second calibration result exceeds a predetermined threshold.

12. The calibration method as set forth in claim 9, further comprising the step of, when a motion program of the robot is executed, applying the mechanical parameter to each teaching point included in the motion program, wherein the applied mechanical parameter corresponds to the calibration result in one of the measurement regions which is the nearest to the teaching point.

* * * * *